United States Patent [19]

Yen

[11] Patent Number: 5,339,197

[45] Date of Patent: Aug. 16, 1994

[54] OPTICAL PELLICLE WITH CONTROLLED TRANSMISSION PEAKING

[76] Inventor: Yung-Tsai Yen, 1192 St. Anthony Ct., Los Altos, Calif. 94022

[21] Appl. No.: 182,376

[22] Filed: Jan. 13, 1994

Related U.S. Application Data

[63] Continuation of Ser. No. 884,464, May 13, 1992, abandoned, which is a continuation of Ser. No. 331,495, Mar. 31, 1989, abandoned.

[51] Int. Cl.$^5$ .................... G02B 1/10; B32B 27/00
[52] U.S. Cl. .................... 359/359; 359/581; 359/589; 359/885; 428/421; 428/509; 264/310; 536/56
[58] Field of Search ............... 350/163, 164, 166, 1.1, 350/171, 172; 427/162, 164, 165, 394, 416; 428/421, 509, 519; 264/310, 311; 359/581, 885, 350, 359, 361, 580, 589, 507; 536/56

[56] References Cited

U.S. PATENT DOCUMENTS

| | | | |
|---|---|---|---|
| 2,369,741 | 2/1945 | Jones et al. | 350/164 |
| 2,490,263 | 12/1949 | Gaiser et al. | 350/164 |
| 2,707,899 | 5/1955 | Nicoll | 350/164 |
| 2,982,178 | 5/1961 | Marks | 350/164 |
| 3,617,354 | 11/1971 | Carnahan | 350/164 |
| 3,906,133 | 9/1975 | Flutie . | |
| 4,046,457 | 9/1977 | Land et al. . | |
| 4,047,804 | 9/1977 | Stephens . | |
| 4,066,814 | 1/1978 | Chiklis . | |
| 4,128,303 | 12/1978 | Onoki et al. | 350/164 |
| 4,131,363 | 12/1978 | Shea et al. . | |
| 4,254,174 | 3/1981 | Flanders et al. . | |
| 4,282,314 | 8/1981 | Dinella et al. . | |
| 4,378,953 | 4/1983 | Winn | 350/1.1 |
| 4,422,721 | 12/1983 | Hahn et al. . | |
| 4,444,826 | 4/1985 | Sasaki et al. . | |
| 4,465,759 | 8/1984 | Duly et al. . | |
| 4,536,240 | 8/1985 | Winn | 264/311 |
| 4,600,682 | 7/1986 | Spong et al. . | |
| 4,625,215 | 11/1986 | Muchnik et al. . | |
| 4,748,050 | 5/1988 | Takahashi et al. | 427/209 |
| 4,759,990 | 7/1988 | Yen | 350/164 |
| 4,796,973 | 1/1989 | Gordon | 350/318 |
| 4,802,737 | 2/1989 | Denton | 350/164 |
| 4,861,402 | 8/1989 | Gordon | 264/1.7 |
| 4,996,106 | 2/1991 | Nakagawa et al. | 428/509 |
| 4,996,813 | 10/1990 | Agou et al. | 427/165 |
| 5,028,702 | 7/1991 | Matsumoto et al. | 536/65 |

FOREIGN PATENT DOCUMENTS

| | | | |
|---|---|---|---|
| 0015101 | 1/1986 | Japan | 350/164 |
| 2038402 | 2/1987 | Japan | 350/311 |
| 0260101 | 11/1987 | Japan | 350/311 |

*Primary Examiner*—Ricky D. Shafer
*Attorney, Agent, or Firm*—Kolisch, Hartwell, Dickinson, McCormack & Heuser

[57] ABSTRACT

A plural-layer, composite, high-transmissivity, optical pellicle is provided. The pellicle includes a base layer with a single anti-reflective coating layer on each side thereof. The composite pellicle has a thickness of 1.2 microns plus or minus 0.1 micron and exhibits transmissivity which peaks at mercury's I, H and G spectral lines.

14 Claims, 1 Drawing Sheet

OPTICAL PELLICLE WITH CONTROLLED TRANSMISSION PEAKING

This is a continuation of application Ser. No. 07/884,464 filed May 13, 1992, now abandoned, which is a continuation of application Ser. No. 07/331,495 filed on Mar. 31, 1989, now abandoned.

BACKGROUND OF THE INVENTION

This invention relates generally to an optical element, such as a membrane or pellicle, and more particularly to an optical pellicle with superior properties of transmissivity.

In recent years, pellicles have played an important role in the fabrication of semiconductor wafers used in integrated semiconductor circuits. As is well understood by those in the art, pellicles protect photomasks which are used in the various photolithography steps required in wafer preparation and fabrication.

The typical pellicle takes the form of an extremely thin optical membrane which is supported on a ring-like frame, the entirety of which is then placed over the photomask to prevent contamination of the mask during photolithography. To be most effective, a pellicle should not only prevent contamination of a photomask, but it also must exhibit a very high degree of optical transmissivity at the wavelength of light used during photolithography. The requirements of transmissivity for an optical pellicle are generally discussed in an article entitled "Pellicle Protection of IC Masks" by Ron Hershel, published in 1981 by the Society of Photo Optical Instrumentation Engineers.

Mercury lamps have typically been used as a light source in lithography operations. These lamps normally exhibit maximum amounts of light at wavelengths of 365, 405 and 436 nanometers, known by those skilled in the art as the mercury atom's I, H and G spectral lines ("the I, H and G lines"), respectively. Projection steppers used in lithography have traditionally used mercury's G line, i.e. light having a wavelength of 436 nanometers. For this reason, pellicles have been developed which exhibit maximum transmissivity at the G line. However, to facilitate use at various wavelengths, so-called broadband pellicles have been developed which exhibit an average transmissivity of about 92% over the I, H and G lines.

Because of the shorter wavelengths at the I and H lines, use of these wavelengths from the mercury lamp can increase resolution beyond that achieved at the G line. While the transmission of a conventional 2.85 micron thick pellicle, that is, 92%, is often sufficient, it would be preferable if the transmission was greater than 92% at the I, H and G lines. Of course, any loss in transmission as the light passes through the pellicle will reduce the light which contacts the mask. This requires either stronger mercury lamps, or increased time of exposure.

Pellicles with multiple anti-reflective coating layers have been developed to increase transmissivity. Such pellicles are disclosed in my U.S. Pat. No. 4,759,990. While these pellicles permit higher average transmissivity for the I, H and G lines, they are typically more expensive than pellicles having a single anti-reflective coating on each side.

A necessary feature of all optical pellicles is that they be relatively durable. If a pellicle product breaks during use, it not only requires replacement, which can be a sensitive operation potentially resulting in contamination of the mask area, but the breakage of the membrane itself can cause contamination by pellicle debris falling onto the mask. Thicker pellicles, such as 2.85 micron pellicles sold by Micro Lithography, Inc., are far more durable than thinner pellicles such as those of 0.86 micron thickness. However, with thicker pellicles, it is often more difficult to control pellicle thickness and uniformity. Thickness control directly affects uniformity, and uniformity can vary not only from pellicle to pellicle (or lot to lot) but also across the face of any particular membrane.

It is therefore a general object of the present invention to provide an optical pellicle which overcomes the drawbacks and limitations of prior art proposals. More specifically, the invention has as its objects the following: (1) to provide a pellicle having peak transmissivity at wavelengths corresponding to the wavelengths emitted by a mercury lamp in a photolithography process; (2) to develop a maximum-transmissivity, optical pellicle that is sufficiently durable that it is not prone to breakage, but which is not so thick that lot-to-lot and edge-to-edge uniformity is a problem; (3) to provide a pellicle which can be used with steppers that are used at the higher resolution, shorter I and H lines; (4) to provide a pellicle which can be used interchangeably with a wide variety of steppers using different wavelengths from mercury light; (5) to provide a pellicle which exhibits greater than 92% transmissivity at the critical wavelengths; (6) to develop a pellicle having a single anti-reflective coating on each side which has transmissivity at the above-identified critical wavelengths approaching that of a pellicle having multiple anti-reflective coatings on each side; and (7) to provide a superior optical pellicle which can be fabricated using largely proven techniques.

SUMMARY OF THE INVENTION

The present invention achieves its objects best by providing a plural layer, composite, high-transmissivity optical pellicle which has a base layer with a predetermined, precise thickness of 1.2 microns plus or minus 0.1 micron. The pellicle includes a base layer with a single anti-reflective coating layer on each side thereof. The transmissivity of the pellicle peaks at the I, H and G lines. The transmissivity of the I and G lines is at least about 99%, while the transmissivity of the H line is at least about 98%.

These and other features and advantages of the present invention will become more fully apparent as this description continues.

DETAILED DESCRIPTION OF A PREFERRED EMBODIMENT

Referring now to the figures, indicated generally at 10 is an optical membrane, commonly called a pellicle, which has been constructed in accordance with the present invention. Element 10 includes a base layer 12, a top layer 14 of anti-reflective coating, and a bottom layer 16 of anti-reflective coating. These layers are prepared by a conventional technique such as spin casting. More specifically, the layers are prepared and cured at room temperature, at or below 100 degrees centigrade.

Base layer 12 has a thickness of about 1.2 microns, and is formed preferably of nitrocellulose, which is conventionally used in pellicles. Alternatively, it may be desirable to fabricate the base layer of cellulose acetate. Layer 12 has a refractive index of about 1.5.

Top anti-reflective coating layer 14 is formed preferably of a fluorocarbon compound, such as described in my U.S. Pat. No. 4,759,990. Top layer 14 has a refractive index of about 1.3, and a thickness of about 0.08 microns, Bottom anti-reflective coating layer 16 is typically formed of the same material as top layer 14, and normally has the same thickness. Like top layer 12, bottom layer 14 has a refractive index of about 1.3. The material for top layer 14 is prepared in accordance with my U.S. Pat. No. 4,759,990, which is incorporated by reference.

By utilizing the previously described thicknesses, a composite pellicle having a thickness of about 1.4 microns is achieved.

Figure 2:
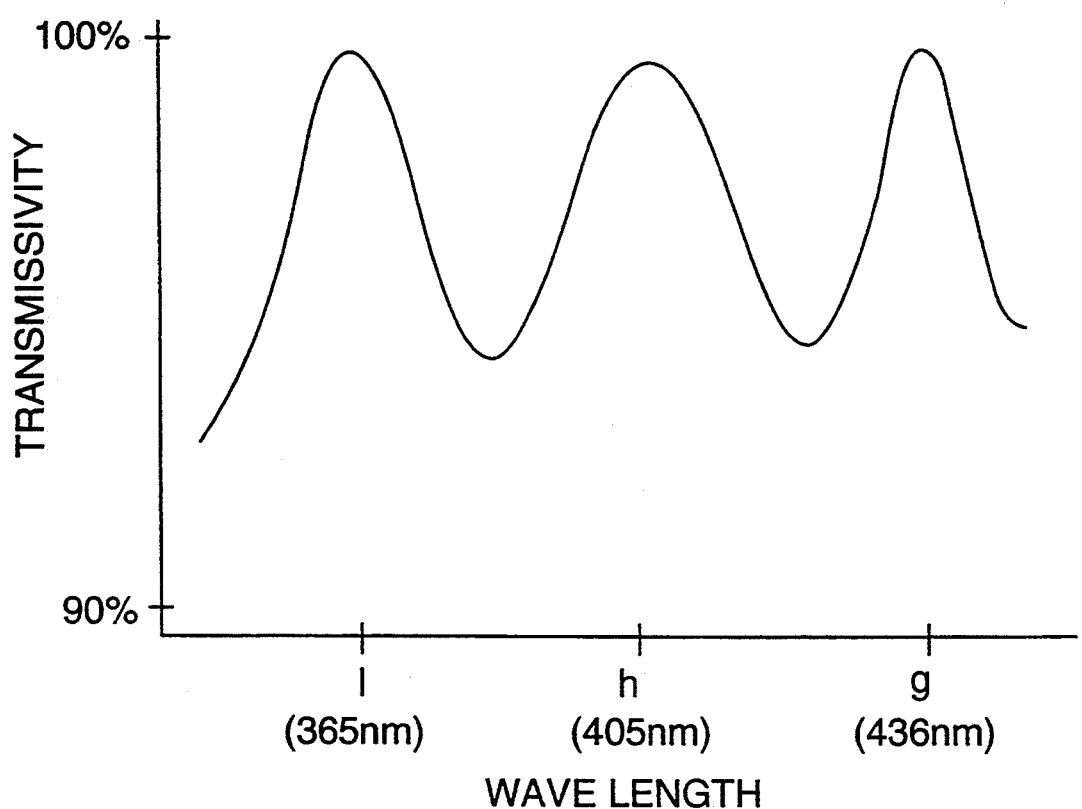
FIG. 2 is a schematic graph showing transmissivity versus wavelength of the preferred embodiment of the present invention.

FIG. 2 displays transmissivity in percentage verses wavelength in nanometers, and graphically depicts the transmissivity of the preferred embodiment of the present invention peaks at the I, H and G lines. More specifically, transmissivity of the I and G lines is at least about 99%, while transmissivity of the H line is at least about 98%. Thus, the present invention achieves what broadband pellicles have been attempting to achieve for years, that is, sufficient transmissivity at the I, H and G lines to enable use on steppers designed to be operated at these wavelengths. More importantly, the present invention peaks transmissivity at all three important wavelengths. Thus, with the present invention, the average transmissivity at the pertinent wavelengths is far greater than the average of approximately 92% achieved with prior broadband pellicles.

Also, it has been determined by fabricating the pellicle in accordance with the teachings of this invention, the pellicle is thick enough to be durable, thereby providing a relatively long life, and minimizing the possibility of fracture. Because the pellicle membrane is relatively thin, it can be fabricated using conventional techniques while achieving sufficient uniformity both across the face of the film, and from film-to-film (or lot-to-lot). Another advantage of the present invention is that the desired transmissivity is achieved by using only a single layer of anti-reflective coating on each side of the base membrane.

The following are examples of peak transmissivities achievable with pellicles made in accordance with the present invention.

EXAMPLE 1

Optical Pellicle: 1.19 micron nitrocellulose base layer; single anti-reflective, fluorocarbon-containing coating on both sides of base layer.

| Mercury Spectral Line | Wavelength/nm | % Transmissivity |
| --- | --- | --- |
| G | 436 | 99.5 |
| H | 405 | 98.9 |
| I | 365 | 99.3 |

EXAMPLE 2

Figure 1:
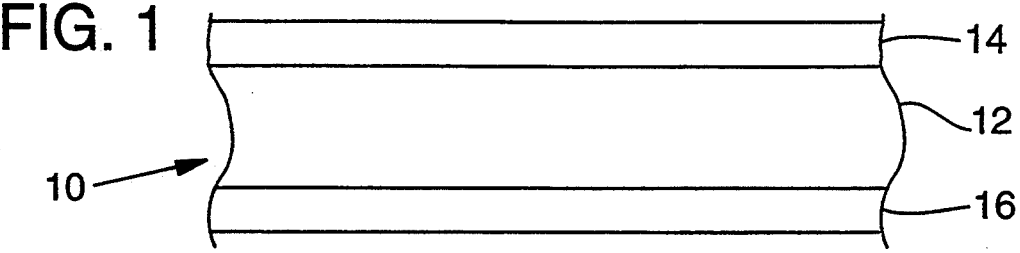
FIG. 1 is a simplified, fragmentary side elevation illustration of a multiple layer, high transmissivity optical pellicle constructed in accordance with the present invention.
Figure 1A:
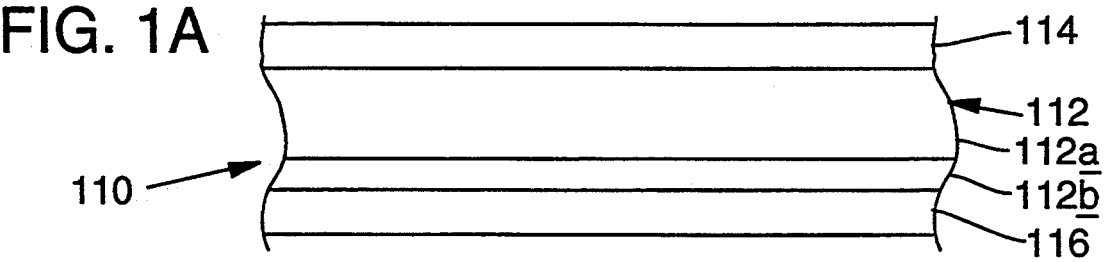
FIG. 1A is like FIG. 1 except that it shows another embodiment of the present invention which includes an optical pellicle with a base layer that is a composite layer comprising two or more layers.

Optical Pellicle: 1.17 micron multiple base layer (see FIG. 1A which shows pellicle 110 with base layer 112 as a composite layer comprising sublayers 112a,112b) of nitrocellulose (1.13 microns) and polystyrene (0.04 microns);. single anti-reflective, fluorocarbon-containing coating on both sides of base layer.

| Mercury Spectral Line | Wavelength/nm | % Transmissivity |
| --- | --- | --- |
| G | 436 | 99.7 |
| H | 405 | 98.8 |
| I | 365 | 99.4 |

While a preferred embodiment of the invention has been disclosed and described herein, it is appreciated that variations and modifications may be made without departing from the spirit and scope of the invention. Those variations and modifications are intended to be covered by the following claims.

It is claimed and desired to secure by Letters Patent:

1. A high-transmissivity, optical pellicle having predetermined, precise thickness and including an organic base layer with a single organic anti-reflective coating layer on each side thereof, the pellicle having a total physical thickness of about 1.4 microns plus or minus 0.1 micron, and the transmissivity of the pellicle positively peaking at mercury's I, H and G spectral lines, with the organic coating layers and the total thickness of the pellicle providing durability and uniformity, and with the transmissivity of the mercury I and G spectral lines being at least about 99 percent, and the transmissivity of the mercury H spectral line being at least about 98 percent.

2. The optical pellicle of claim 1 wherein the base layer is formed of a cellulose-based compound.

3. The optical pellicle of claim 2 wherein the anti-reflective coating layers are formed of fluorocarbon compounds joined to and distributed over the base layer.

4. The pellicle of claim 3 wherein said fluorocarbon compound is prepared in a fluorinated solvent.

5. The pellicle of claim 1 wherein the material for the base layer is selected from the group consisting of nitrocellulose and cellulose acetate.

6. The pellicle of claim 1 wherein said layers are formed by sequential spin casting.

7. The pellicle of claim 1 wherein said base layer is a composite layer comprising two or more sublayers.

8. A high-transmissivity, optical pellicle having predetermined, precise thickness and including an organic base layer with a single organic anti-reflective coating layer on each side thereof, the pellicle having a total physical thickness of about 1.4 microns plus or minus 0.1 micron, and the transmissivity of the pellicle positively peaking at mercury's I, H and G spectral lines, and wherein the anti-reflective coatings are applied to the base layer at no higher than 100 degrees centigrade, and the transmissivity of the mercury I and G spectral lines being at least 99 percent, and the transmissivity of the mercury H spectral line being at least 98 percent.

9. The optical pellicle of claim 8 wherein the base layer is formed of a cellulose-based compound.

10. The optical pellicle of claim 9 wherein the antireflective coating layers are formed of fluorocarbon compounds joined to and distributed over the base layer.

11. The pellicle of claim 10 wherein said fluorocarbon compound is prepared in a fluorinated solvent.

12. The pellicle of claim 8 wherein the material for the base layer is selected from the group consisting of nitrocellulose and cellulose acetate.

13. The pellicle of claim 8 wherein said layers are formed by sequential spin casting.

14. The pellicle of claim 8 wherein said base layer is a composite layer comprising two or more sublayers.

* * * * *